R. R. & W. K. WILEY & W. S. HOUGH, Jr.

ILLUMINATED SIGN.

APPLICATION FILED FEB. 5, 1913.

Reissued Apr. 29, 1913. 13,558.

2 SHEETS—SHEET 1.

R. R. Wiley
W. K. Wiley
and W. S. Hough, Jr., INVENTORS,
BY E. G. Siggers
ATTORNEY WITNESSES
Howard D. Ort
F. T. Chapman R. R. & W. K. WILEY & W. S. HOUGH, Jr.

ILLUMINATED SIGN.

APPLICATION FILED FEB. 5, 1912.

Reissued Apr. 29, 1913.

13,558

2 SHEETS—SHEET 2.

R. R. Wiley,
W. K. Wiley
and W. S. Hough, Jr.,
INVENTORS,

WITNESSES

Howard D. Orr.

F. T. Chapman.

BY C. G. Siggers.

ATTORNEY

UNITED STATES PATENT OFFICE.

ROY RODNEY WILEY AND WALLACE KENNETH WILEY, OF BUFFALO, NEW YORK, AND WILLIAM SIMPSON HOUGH, JR., OF ST. CATHERINES, ONTARIO, CANADA, ASSIGNORS TO FLEXLUME SIGN COMPANY, OF BUFFALO, NEW YORK, A CORPORATION.

ILLUMINATED SIGN.

13,558. Specification of Reissued Letters Patent. Reissued Apr. 29, 1913.

Original application filed October 24, 1908, Serial No. 459,388. Renewed December 26, 1909, Serial No. 534,163. Original No. 948,557, dated February 8, 1910. Application for reissue filed February 5, 1912. Serial No. 675,694.

*To all whom it may concern:*

Be it known that we, ROY R. WILEY and WALLACE K. WILEY, citizens of the United States of America, and residents of Buffalo, in the county of Erie, State of New York, and WILLIAM S. HOUGH, Jr., a citizen of the United States of America, and resident of St. Catherines, in the Province of Ontario and Dominion of Canada, have invented certain new and useful Improvements in Illuminated Signs, of which the following is a specification.

Our invention relates to signs in general, and to illuminated signs in particular.

The objects of the invention are to produce a maximum brilliancy, with a minimum number of lamps; to protect the reflecting surfaces from dirt and the weather; to eliminate all useless portions of the reflecting surfaces, for the purpose of reducing bulk and weight; to eradicate blurring effects and localized bright spots, and to provide a durable sign for long distance vision, as well as for short range.

The statement of the invention is as follows, it being noted that the various scopes of the invention are attended to in the claims hereinafter annexed.

The organization, underlying our conception, consists of a plurality of central segments of parabolic reflectors placed relatively to each other so as to form a character, a box whose contour is that of said character, surrounding said reflectors, a glass plate covering said box, and lamps for the reflectors.

Figure 1:
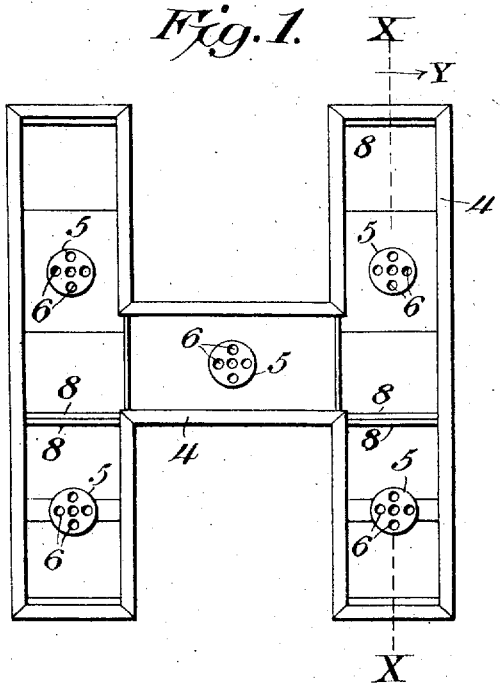
Figure 2:
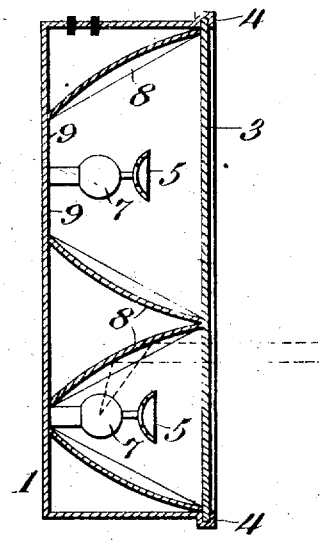
Figure 3:
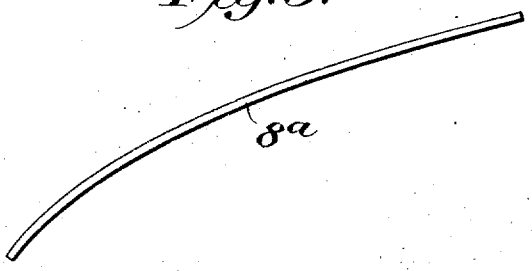
Figure 5:
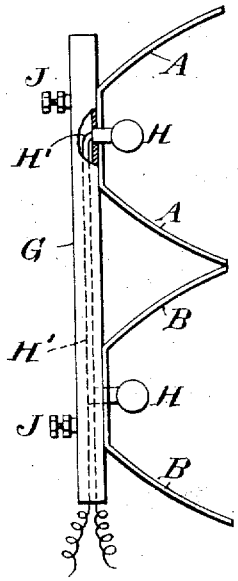
Figure 4:
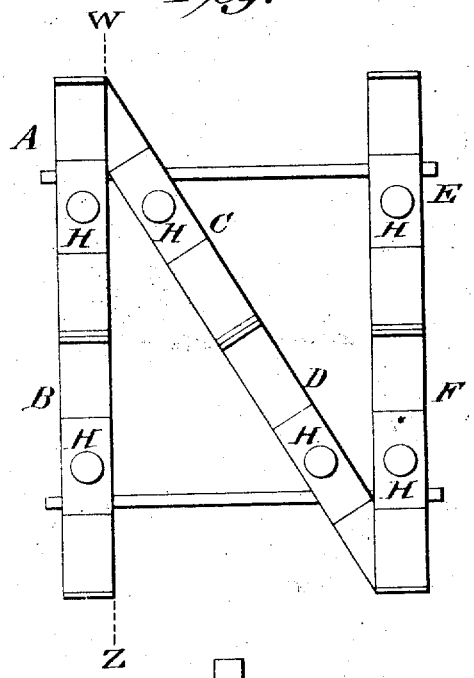
Figure 6:
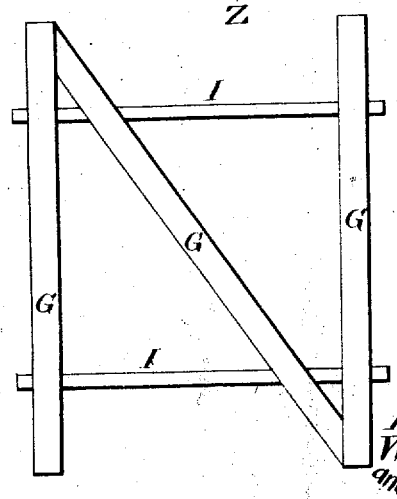

Figure 1 is a front elevation of the device. Fig. 2 is a vertical section at the line X X in Fig. 1, looking in the direction of the arrow Y. Fig. 3 is a side elevation of a portion of a modified reflector, on an enlarged scale. Fig. 4 is a front elevation of a modified construction of the letter N. Fig. 5 is a side view of that portion of the letter N, at the left of the line W Z. Fig. 6 is a front elevation of the frame used in Fig. 4.

Referring particularly to Figs. 1 and 2, the structure consists of a box, shaped like the letter H, and having its front covered by a glass plate 2, and held by bent over lips 4, which are a part of the material of the box 1, and a plurality of central segmental parabolic reflectors 8, grouped to form the letter H, and located inside of said box 1, the reflecting portion of the reflector being that portion of a paraboloid, which lies between two parallel planes, respectively on opposite sides of the axis of the paraboloid, and lamps 7 for the reflectors, respectively located at the foci of the reflectors. In addition, we may use small auxiliary reflectors 5 in front of the lamps, for throwing the light, incident thereon, back to the main parabolic reflector, thereby preventing the appearance of a dotted or spotted sign, and serving to increase the legibility at a distance. The small reflectors are shown perforated, at the holes 6, to form screens.

In operation, the light is divided, one portion being reflected by each reflector 8, in a beam of light having approximately a rectangular shaped cross section, another portion being thrown forward by the flat surface 9, at the back of the lamp, and another portion striking the reflector 5, then the reflectors 9 and 8, and finally leaving the device, while some of the light radiated to the reflector 5, passes through the holes thereof, and evens up the general brilliancy of the character. The reflectors or screens 5 serve to eradicate blurring effects and localized bright spots by softening the intensity of the light sources, so far as the direct transmission of light is concerned, since a part only of the light passes through the screens by way of the holes 6, while the light intercepted and diverted by the screens to the reflectors 8 from the sign-character side of the light source serves to intensify the light directed through the sign character from the reflectors 8 by the addition to such reflected light of the light diverted backwardly by the screens 5 to said reflectors 8, thus making up for the loss of light reaching the reflectors 8 directly from the light source, since the intensity of light undergoing reflection is reduced by such reflection. This softening or reducing of the direct light by the screens 5 and the intensifying of the light reflected by the reflectors 8, practically all about the screens 5, is found to effectually prevent blurring or localized bright spots and contributes to the production of even illumination over the entire sign-character, whether viewed at short range or from a long distance.

Our invention may be modified without departing from the spirit thereof. Instead of the more common parabolic surface of spoon shape, the surface 8ª may be that described by a parabolic curve moved parallel to a plane in which lies the axis and the directrix of the parabola, and farther and farther away from said plane, Fig. 3 being an enlarged side view of a portion of such a parabolic surface, and Figs. 4, 5 and 6 being different views of complete parabolic surfaces applied in a modified construction. The said modified construction embodies the omission of glass fronts and casings for the reflectors.

We will now describe the modifications shown in Figs. 4, 5 and 6. A series of reflectors A, B, C, &c., are mounted end to end on an N shaped frame, composed of long and narrow boxes G, which contain the wiring H′ for the lamps H. I represents cross braces for making the structure suitable for shipping and for endurance. J represents bolts and nuts for attaching the letter N to supports usually on the tops or sides of the buildings.

By this simple construction, it is easy to provide signs several feet high, and by means of only one lamp in each reflector, the sign appears brilliant all over its surface, and at great distances away.

What is claimed is:—

1. In an illuminated sign, the combination of a pair of parabolic reflectors, each approximately rectangular in outline, and placed opposite each other so as to have their foci coincident, a third rectangular reflector joining the ends of said pair of reflectors, a lamp located at the common focus, and other like combinations of reflectors and lamps grouped together to form the shape of a character.

2. In an illuminated sign, the combination of a series of central segments of parabolic reflectors, placed end to end to form a character, said segments being those portions which lie between parallel planes on opposite sides of and parallel to the axis of the parabola, and lamps at the foci.

3. In an illuminated sign, the combination of a plate of glass, of rectangular outline, a pair of parabolic reflectors, having an end of each bearing against said glass plate, and each reflector approximately rectangular in outline and both placed opposite each other so as to have their foci coinciding, a flat rectangular reflector joining the ends of said reflectors, and a lamp located approximately at the common focus of said reflectors, and other like combinations of glass, reflectors, and lamps, grouped together to form the shape of a character.

4. In an illuminated sign, a sign character of light transmitting material, a light giving means positioned for the direct passage of light from said light giving means through the sign character, reflecting means for directing light through portions of the sign character, and light modifying means between the light giving means and the sign character and permitting the unmodified passage of a portion of the light emitted from the light giving means through the light modifying means to and through the sign character.

5. In an illuminated sign, a sign character of light transmitting material, a light giving means on the side of the sign character remote from that to be observed, reflectors related to the source of light to direct light rays from the source of light at different angles through the sign character, and a light reducing screen between the source of light and adjacent portions of the sign character, said light reducing screen permitting unmodified passage therethrough of a portion of the light from the light source and having a reflecting face toward the source of light to divert portions of the light to the said reflectors to be again reflected to and through the sign character.

6. In an illuminated sign, a sign character of light transmitting material, a source of light on the side of the sign character remote from the side thereof to be observed, reflectors related to the source of light to direct light rays therefrom at different angles through the sign character, and a perforated screen between the source of light and the sign character and having the face toward the source of light constructed to reflect the light striking it on to the first named reflectors to be again reflected in a direction to traverse the sign character.

In testimony, that we claim the foregoing as our own, we have hereto affixed our signatures in the presence of two witnesses.

ROY RODNEY WILEY.
WALLACE KENNETH WILEY.
WILLIAM SIMPSON HOUGH, JR.

Witnesses:
ROSS F. SPENDELOW,
J. A. ROGERS.